US007515207B2

(12) United States Patent
Nakao

(10) Patent No.: US 7,515,207 B2
(45) Date of Patent: Apr. 7, 2009

(54) TELEVISION BROADCAST RECEIVING APPARATUS, PROGRAM INFORMATION PROCESSING METHOD AND PROGRAM INFORMATION PROCESSING PROGRAM

(75) Inventor: Muneharu Nakao, Chiba (JP)

(73) Assignee: Sony Corporation (JP)

( * ) Notice: Subject to any disclaimer, the term of this patent is extended or adjusted under 35 U.S.C. 154(b) by 433 days.

(21) Appl. No.: 11/137,287

(22) Filed: May 25, 2005

(65) Prior Publication Data

US 2005/0273813 A1 Dec. 8, 2005

(30) Foreign Application Priority Data

May 31, 2004 (JP) ............................ P2004-162321

(51) Int. Cl.
*H04N 5/445* (2006.01)
*H04N 5/45* (2006.01)

(52) U.S. Cl. .................... 348/564; 348/565; 725/41; 725/43

(58) Field of Classification Search ................ 348/569, 348/563, 564, 565, 584; 725/39–43
See application file for complete search history.

(56) References Cited

U.S. PATENT DOCUMENTS

| 6,020,930 | A | 2/2000 | Legrand |
| 6,115,080 | A | 9/2000 | Reitmeier |
| 6,563,515 | B1 * | 5/2003 | Reynolds et al. ............ 715/721 |
| 6,728,967 | B2 * | 4/2004 | Bennington et al. ........... 725/43 |
| 6,853,378 | B2 * | 2/2005 | Enokida et al. ............. 345/473 |
| 2004/0003399 | A1 | 1/2004 | Cooper |
| 2004/0181813 | A1 | 9/2004 | Ota et al. |
| 2004/0194134 | A1 | 9/2004 | Gunatilake et al. |
| 2004/0239809 | A1 * | 12/2004 | Kim et al. .................... 348/563 |
| 2005/0110909 | A1 | 5/2005 | Staunton et al. |

FOREIGN PATENT DOCUMENTS

| JP | 10-304320 A | 11/1998 |
| JP | 2002-320153 A | 10/2002 |
| JP | 2003-219307 A | 7/2003 |
| JP | 2004-007228 A | 1/2004 |
| JP | 2005-522152 A | 7/2005 |
| WO | 03/085965 A1 | 10/2003 |
| WO | WO-2004/056098 A1 | 7/2004 |

* cited by examiner

*Primary Examiner*—M. Lee
(74) *Attorney, Agent, or Firm*—Lerner, David, Littenberg, Krumholz & Mentlik, LLP

(57) ABSTRACT

A television broadcast receiving apparatus includes a first receiver operable to receive a first television broadcast; a second receiver operable to receive a second television broadcast; a decoding unit operable to decode video data multiplexed to the first television broadcast and to output the decoded video data as a program video image; and an information processing unit operable to decode, using software, a part of image data included in video data multiplexed to the second television broadcast to produce a program image of the second television broadcast and to output the program image. The program image is added to program information of the second television broadcast and output as composite information.

7 Claims, 4 Drawing Sheets

CONSTRUCTION OF DIGITAL TELEVISION APPARATUS

MEMORY MAPPING

TELEVISION BROADCAST RECEIVING APPARATUS, PROGRAM INFORMATION PROCESSING METHOD AND PROGRAM INFORMATION PROCESSING PROGRAM

CROSS-REFERENCE TO RELATED APPLICATIONS

The present invention claims priority from Japanese Patent Application No. JP2004-162321 filed on May 31, 2004, the disclosure of which is hereby incorporated by reference herein.

BACKGROUND OF THE INVENTION

The present invention relates to a television receiving apparatus and is preferably applied to a television receiving apparatus receiving a multiplexed digital television broadcast.

In the past, a digital television receiving apparatus, such as a digital television apparatus and a digital television tuner, has included multiple demultiplexers. In such case, the digital television receiving apparatus demultiplexes a stream and extracts a program that a user desires to view (called a viewed program hereinafter) by using a main demultiplexer thereof and decodes the viewed program using a decoder to display it. Furthermore, the digital television receiving apparatus obtains program information (such as titles of programs, descriptions of programs and channel numbers) for programs on other channels using a sub-multiplexer and displays the program information on an information display area partially provided on the screen (see, for example, JP-A-2004-7228).

However, in the digital television receiving apparatus having the foregoing construction, program information for programs on other channels to be displayed is text information only, and the number of letters displayable within the information display area is limited. Therefore, the details of the program information are difficult to understand at a glance, which is a problem.

Accordingly, it is desirable to propose a television receiving apparatus which can provide details of a program not currently being viewed clearly in a simple construction.

SUMMARY OF THE INVENTION

According to an embodiment of the present invention, there is provided a television broadcast receiving apparatus including a first receiver operable to receive a first television broadcast on a first channel; a second receiver operable to receive a second television broadcast on a second channel; a decoding unit operable to decode video data multiplexed to the first television broadcast and to output the decoded video data as a program video image; and an information processing unit operable to decode, using software, a part of image data included in video data multiplexed to the second television broadcast to produce a program image of the second television broadcast, and to output the program image.

Thus, program images of programs on other channels can be obtained without requiring a separate decoding unit.

In this case, the first and second television broadcasts may undergo inter-frame prediction encoding, and the information processing unit may decode image data of an intra-frame encoded image of the video data multiplexed to the second television broadcast and output the decoded image data as the program image.

The processing load and/or work memory which may be necessary for decoding can be reduced by selecting and decoding an intra-frame encoded image which may be decoded independently.

The television broadcast receiving apparatus may further include an added-data demultiplexing unit operable to demultiplex added data multiplexed to the second television broadcast to produce program information of the second television broadcast; and a program information outputting unit operable to add the program image of the second television broadcast to the program information of the second television broadcast to produce composite information, and to output the composite information.

The second receiver may sequentially select and receive multiple television broadcasts on channels other than the first channel; and the information processing unit may create a program image for each of the multiple television broadcasts sequentially selected and received by the second receiver.

Since the program images of programs not received by the first receiver are added to program information, it is possible to clearly provide details of programs not currently viewed for a user.

According to the embodiments of the invention, there is provided a television receiving apparatus which can provide details of a program not currently viewed clearly in a simple construction.

The invention is applicable to various television receiving apparatus.

DETAILED DESCRIPTION

An embodiment of the invention will be described below in detail with reference to the drawings.

(1) Construction of Digital Television Apparatus

Figure 1:
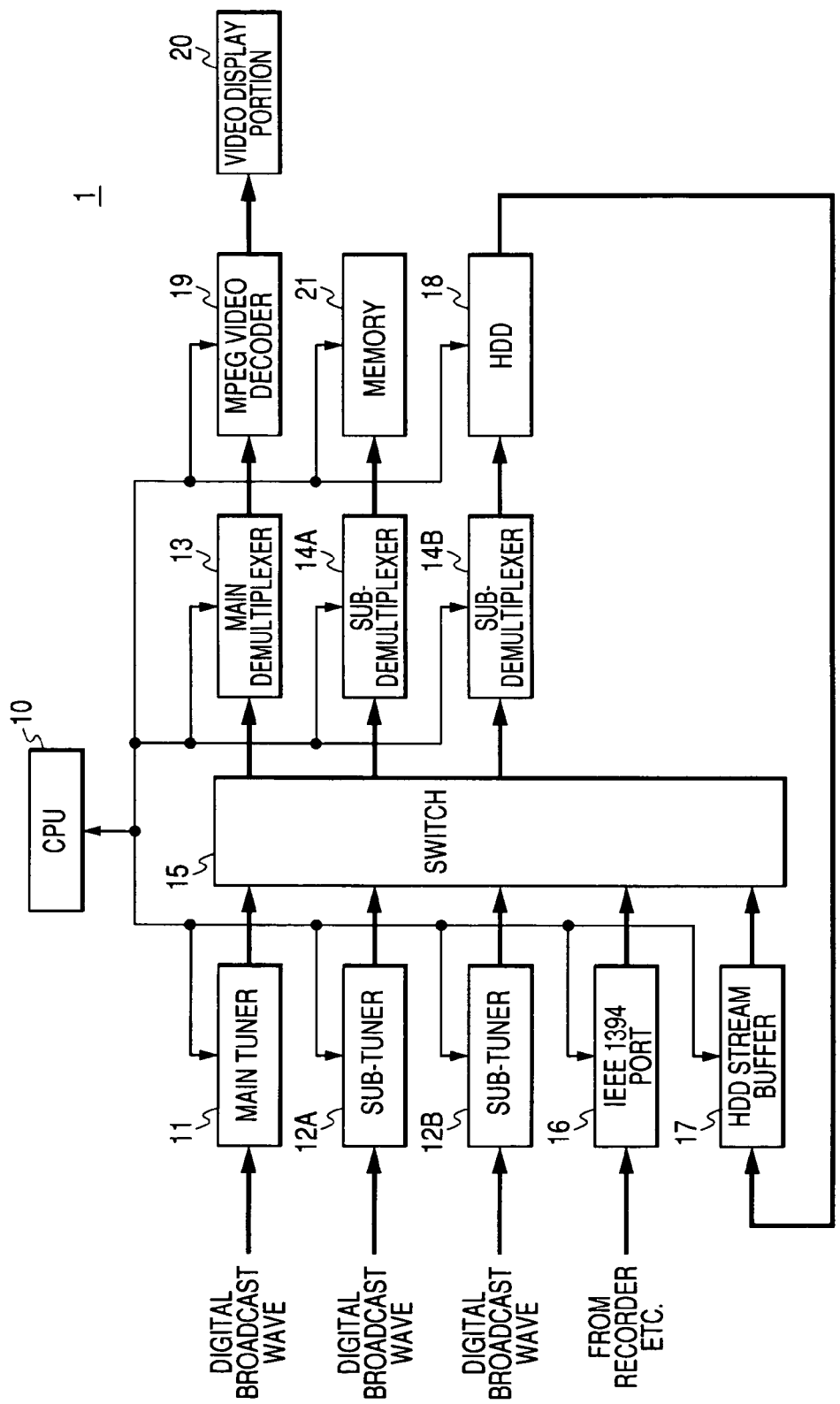
FIG. 1 is a block diagram showing the construction of a digital television apparatus.

FIG. 1 shows an entire digital television apparatus 1 according to an embodiment of the invention, and a CPU 10 which controls the entire apparatus.

The digital television apparatus 1 has a main tuner 11 for receiving a currently viewed or recorded program and two sub-tuners 12A and 12B for receiving programs on other channels. The digital television apparatus 1 further has a main demultiplexer 13 for demultiplexing the viewed program and two sub-demultiplexers 14A and 14B for demultiplexing the programs on other channels.

The main tuner 11 serving as a first receiver and the two sub-tuners 12A and 12B serving as second receivers select and demodulate a digital broadcasting wave received through an antenna (not shown), create a transport stream and feed the created transport stream to a switch 15.

An IEEE (Institute of Electrical and Electronics Engineers) 1394 port 16 feeds a transport stream fed from a recorder (not shown), such as a hard disk recorder, to the switch 15. An HDD (Hard Disk Drive) stream buffer 17 feeds a transport stream loaded from the hard disk drive 18 to the switch 15.

Under the control of the CPU 10, the switch 15 selects one of the transport streams fed from the main tuner 11, sub-tuners 12A and 12B, IEEE 1394 port 16 and HDD stream buffer 17 and feeds the selected transport stream to the main demultiplexer 13 or sub-demultiplexers 14A or 14B.

Here, in a digital television broadcast, program data of multiple programs are multiplexed to one digital broadcasting wave. The main demultiplexer 13 extracts program data of a viewed program selected by a user from transport streams fed from the main tuner 11 and demultiplexes the program data into video data, audio data and added data. The main demultiplexer 13 feeds the demultiplexed video data to an MPEG (Motion Picture Experts Group) video decoder 19. The MPEG video decoder 19 decodes the demultiplexed video data to create a video signal and then feeds the video signal to a subsequent display portion 20, whereby the video image of the viewed program is displayed.

On the other hand, the sub-demultiplexer 14A serving as an added-data demultiplexer demultiplexes added data of a program on another channel from a transport stream fed from the sub-tuner 12A or 12B and stores the added data in a memory 21. The sub-demultiplexer 14B extracts a program on another channel from a transport stream fed from the sub-tuner 12A or 12B and stores the program in a hard disk drive 18.

In accordance with a user's operation, the CPU 10 obtains the added data of programs on other channels stored in the memory 21, superimposes the program information for the programs on other channels (called other-channel program information hereinafter) on the displayed viewed program based on the added data and displays the composite information on the display portion 20.

(2) Display of Images of Programs On Other Channels by Digital Television Apparatus of the Invention Here, the displayability of the entire video images of the programs on other channels together with the program information for the programs on the other channels can provide detailed descriptions of the programs on the other channels to a user. However, in order to decode video data of programs on other channels, one more MPEG video decoder with a larger circuit may be required. Furthermore, a large capacity MPEG video capture buffer may be required for decoding a video image. This may disadvantageously complicate the construction of the digital television apparatus.

Accordingly, the digital television apparatus 1 of the embodiment of the invention may decode the video data of a program on another channel demultiplexed by the sub-demultiplexer 14A or 14B in software by using a program executable on the CPU 10 serving as an information processor. However, the entire moving image of the video data may require a large amount of CPU power for software decoding, which is not realistic.

Therefore, the digital television apparatus 1 is configured to decode a part of the video data of a program on another channel as a still image and to display the still image as a program image. Thus, the MPEG video decoder for programs on other channels can be omitted, and the necessity for an MPEG video capture buffer 21A and an MPEG video frame buffer 21B for programs on other channels, as shown in the memory 21 of FIG. 3, may be eliminated.

In reality, video data of a digital television broadcast is encoded by MPEG2 by using inter-frame prediction, and pre-decoding a referenced picture may be required in order to decode the P-picture and B-picture. However, the I-picture serving as an intra-frame encoded image can be decoded independently. Thus, the digital television apparatus 1 selects and decodes image data of only the I-picture within the video data of a program on another channel. Therefore, the processing load and/or work memory which may be necessary for decoding can be reduced.

The digital television apparatus 1 further decodes and, at the same time, converts the I-picture into JPEG, whereby the data size of the decoded program image can be reduced. For example, converting one approximately 2 MB HD (high-definition) image of 1920×1080 pixels into JPEG results in about a 200 kB image. Thus, the size of the image cache for programs on other channels 21C (FIG. 3) for storing program images of programs on other channels can be greatly reduced.

Then, the digital television apparatus 1 sequentially selects channels excluding the currently viewed channel, stores the program images and added data in the memory 21 and displays a list of the program images as an electronic program table in addition to the program information extracted from the added data or sequentially displays a display area of information for programs on other channels (which will be described later) provided on the display screen.

Figure 2:
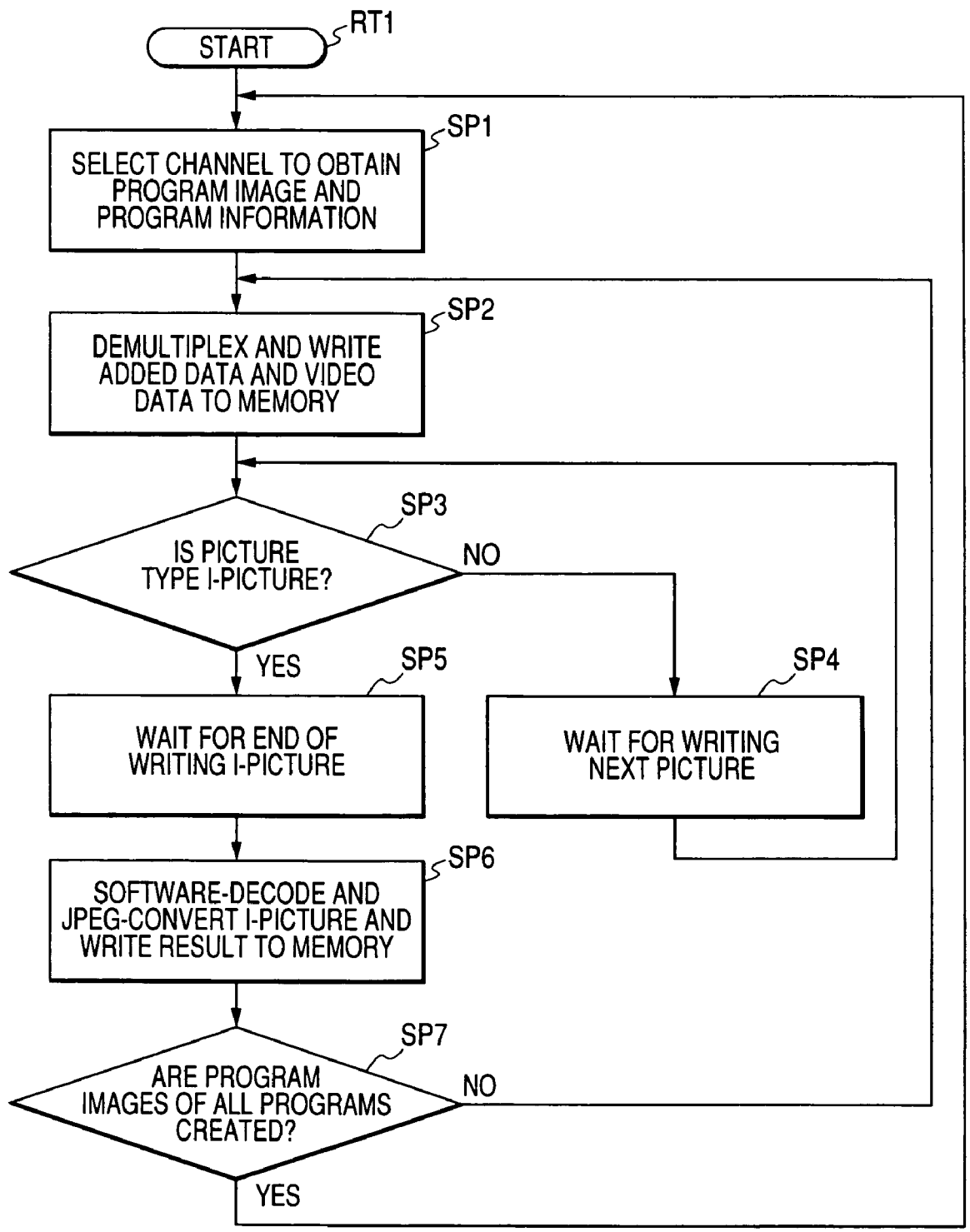
FIG. 2 is a flowchart showing the processing steps to obtain a program image.

Next, the processing steps to decode and store a program image of a program on another channel to be performed by the digital television apparatus 1 will be described in detail with reference to the flowchart shown in FIG. 2.

When the digital television apparatus 1 is started, the CPU 10 of the digital television apparatus 1 starts with the start step of the still image obtaining process RT1 and moves to step SP1 where the sub-tuner 12A or 12B is controlled to select a channel which is not being viewed and for which the program image and program information are attempted to be obtained. Then, the CPU 10 moves to the next step SP2.

Figure 3:
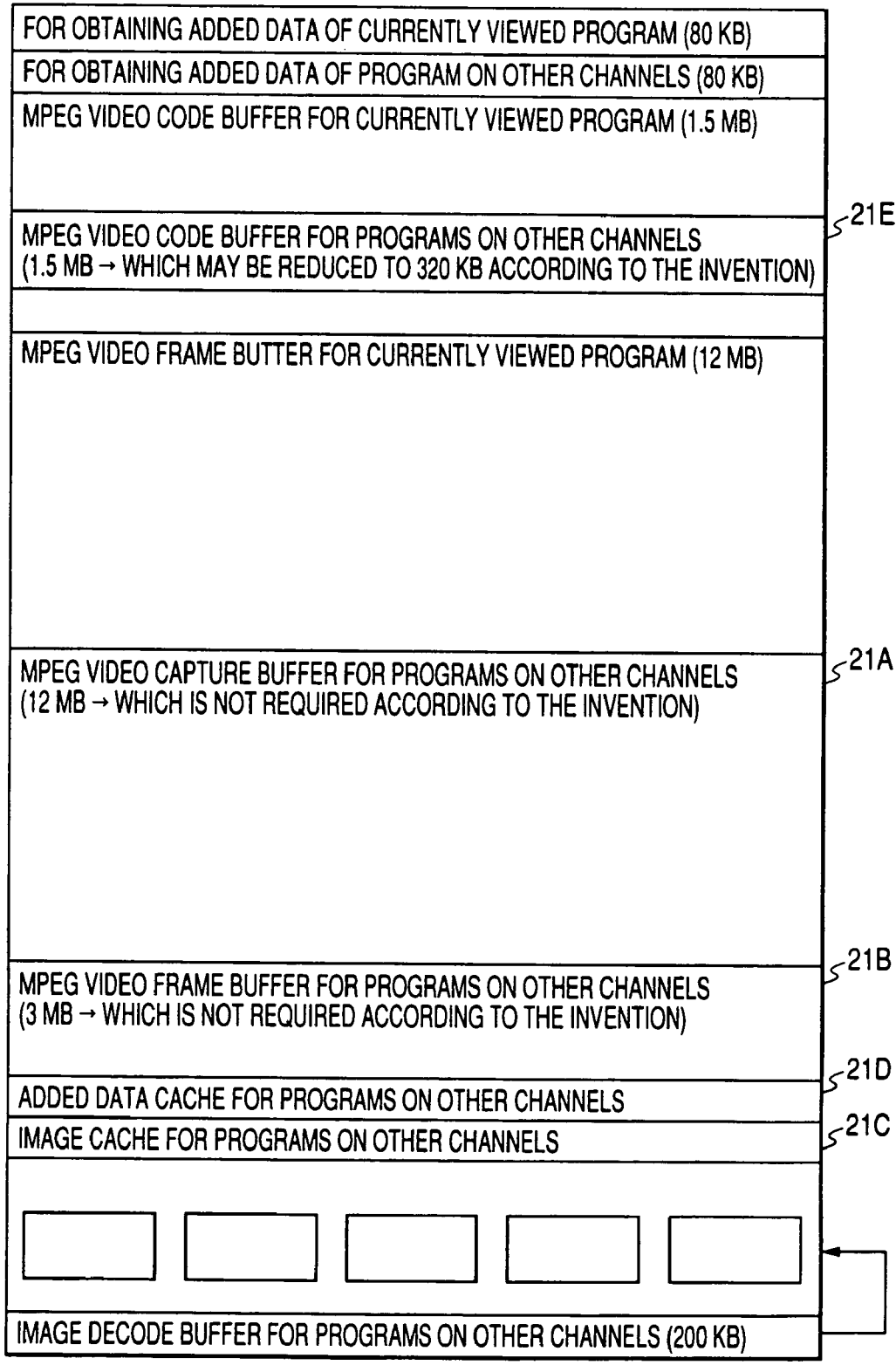
FIG. 3 is a schematic diagram illustrating a memory mapping.

In step SP2, the CPU 10 controls the sub-demultiplexer 14A or 14B to demultiplex the added data and video data from the received data of the program for which the program image and program information are attempted to be obtained from among multiple programs multiplexed to a transport stream fed from the sub-tuner 12A or 12B, to load the demultiplexed added data to the added data cache for programs on other channels 21D (FIG. 3) of the memory 21 shown in FIG. 3, and to load the video data to an MPEG video code buffer for programs on other channels 21E of the memory 21.

Here, as described above, the digital television apparatus 1 selects and decodes only the I-picture of the video data to a program image, whereby the size of the MPEG video code buffer for programs on other channels 21E can be reduced. In other words, while decoding all pictures of the video data may require approximately 1.5 MB as the MPEG video code buffer for programs on other channels 21E, decoding the I-picture only may only require 320 kB equal to the data amount for two pictures.

In the next step SP3, the CPU 10 determines whether the picture type of the video data being loaded to the MPEG video code buffer for programs on other channels 21E of the memory 21 is an I-picture. If it is determined that the picture type is not an I-picture in step SP3, the CPU 10 moves to step SP4 and waits for the loading of the next picture. When the loading of the next picture is started, the CPU 10 returns to step SP3.

On the other hand, if it is determined that the picture type is an I-picture in step SP3, the CPU 10 moves to step SP5 and waits for the end of loading of the I-picture. When the loading ends, the CPU 10 moves to step SP6.

In step SP6, the CPU 10 uses software to decode and convert the I-picture to JPEG, creates a program image of the program on the other channel, loads the program image to the image cache for programs on other channels 21C and moves to the next step SP7.

In step SP7, the CPU 10 determines whether still images for all of the programs on the selected channels have been created. If it is determined in step SP7 that program images for all of the programs have not yet been created, the CPU 10 returns to step SP2 and selects the next program and then performs steps SP2 to SP7 again. On the other hand, if it is determined in step SP7 that program images for all of the programs have been created, the CPU 10 returns to step SP1 and selects the next channel and then performs steps SP1 to SP7 again.

The digital television apparatus 1 in this way sequentially selects a channel not being received by the main tuner 11 currently, obtains added data and a program image of the program on the other channel and stores them in the memory 21.

Figure 4:
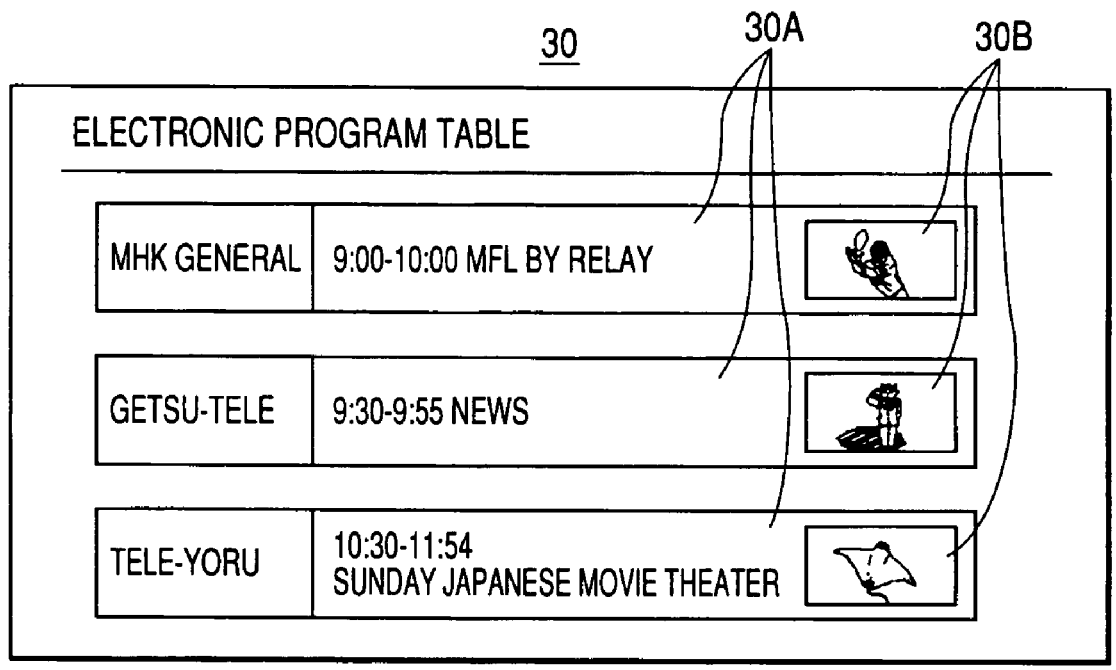
FIG. 4 is a schematic diagram of an EPG screen.
Figure 5:
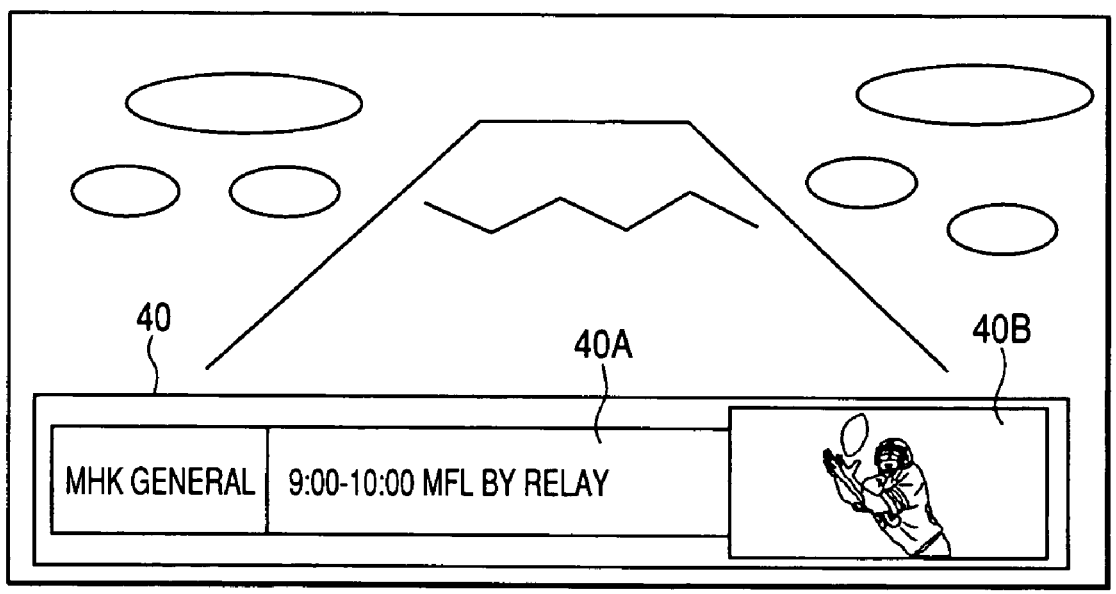
FIG. 5 is a schematic diagram for explaining an information display area.

Then, the CPU 10 serving as an information output section uses the program information extracted from the still image and the added data stored in the memory 21 to display the program information 30A and program image 30B of each program on an electronic program table screen 30 shown in FIG. 4, or to sequentially display the program information 40A and program image 40B of each program on another channel on an other-channel information display area 40 shown in FIG. 5.

(3) Operations and Advantages

Under the construction described above, the digital television apparatus 1 receives, decodes and displays a viewed program by using the main tuner 11, main demultiplexer 13 and MPEG video decoder 19, and, on the other hand, obtains and stores added data of programs on other channels in the added data cache for programs on other channels 21D of the memory 21 by using the sub-tuners 12A and 12B and the sub-demultiplexers 14A and 14B.

In addition, the CPU 10 of the digital television apparatus 1 decodes in software and stores the I-picture of the video data of the programs on other channels in the image cache for programs on other channels 21C as program images.

Then, the CPU 10 of the digital television apparatus 1 uses program information and program images extracted from the added data to display program information 30A and program images 30B of programs on the electronic program table screen 30, or to sequentially display the program information 40A and program images 40B of programs on other channels on the other channel program information display area 40 together with the viewed program. The digital television apparatus 1 in this way displays text program information and program images so that the descriptions of the programs can be provided to a user in more detail.

Here, program images are created by software-decoding by the CPU 10 so that the digital television apparatus 1 can create program images of programs in a simple construction without requiring an MPEG video decoder for the programs on other channels.

Under this construction, detailed descriptions of programs can be provided to a user in a simple construction by displaying the I-picture of the video data of the programs together with program information serving as program images through software-decoding by the CPU 10.

(4) Other Embodiments

While, according to the embodiment described above, the invention is applied to a digital television apparatus which receives and displays a digital television broadcast, the invention is not limited thereto. The invention is applicable to various television receiving apparatus such as a cellular phone or a personal computer having a function of receiving a digital television broadcast, a digital television tuner which receives and displays a digital television broadcast on an external monitor, for example, and a video tape recorder which receives and records a television broadcast.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A television broadcast receiving apparatus, comprising:
    a first receiver operable to receive a first television broadcast on a first channel;
    a second receiver operable to receive a second television broadcast on a second channel;
    a decoding unit operable to decode video data multiplexed to the first television broadcast and to output the decoded video data as a program video image; and
    an information processing unit operable to decode, using software, a part of image data included in video data multiplexed to the second television broadcast to produce a program image of the second television broadcast, and to output the program image,
    wherein the first and second television broadcasts each undergo inter-frame prediction encoding so as to each form a respective plurality of I, P, and B pictures representative of a plurality of video frames, and
    wherein the information processing unit is further operable to determine whether a picture type of a current frame of the video data multiplexed to the second television broadcast is an intra-frame (I) picture, and if the picture type is determined to be an I picture to decode and convert image data corresponding thereto into a JPEG format and to output the decoded and converted image data as the program image, and if the picture type is determined not to be the I picture to wait for a next frame of the video data multiplexed to the second television broadcast such that the image data of the current frame is not decoded.

2. The television broadcast receiving apparatus according to claim 1, further comprising:
    an added-data demultiplexing unit operable to demultiplex added data multiplexed to the second television broadcast to produce program information of the second television broadcast; and
    a program information outputting unit operable to add the program image of the second television broadcast to the program information of the second television broadcast to produce composite information, and to output the composite information.

3. The television broadcast receiving apparatus according to claim 1, wherein
    the second receiver sequentially selects and receives multiple television broadcasts on channels other than the first channel; and
    the information processing unit creates a program image for each of the multiple television broadcasts sequentially selected and received by the second receiver.

4. The television broadcast receiving apparatus according to claim 3, further comprising:
    a storage unit operable to store the program image created for each of the multiple television broadcasts sequentially selected and received by the second receiver;
    an added-data demultiplexing unit operable to demultiplex added data multiplexed to each of the multiple television broadcasts sequentially selected and received by the second receiver to produce program information for each of the multiple television broadcasts; and a program information outputting unit operable to add the program image stored in the storage unit for each of the multiple television broadcasts to the program information for respective ones of the multiple television broadcasts to produce composite information for each of the multiple television broadcasts, and to output the composite information for each of the multiple television broadcasts as an electronic program table.

5. A program information processing method, comprising:

determining whether a picture type of a current frame of video data multiplexed to a received television broadcast is an intraframe (I) picture;

if the picture type is determined to be an I picture decoding and converting image data corresponding thereto to produce a program image of the received television broadcast in a JPEG format, and if the picture type is determined not to be the I picture waiting for a next frame of the video data multiplexed to the received television broadcast such that the image data of the current frame is not decoded;

extracting program information from added data multiplexed to the received television broadcast;

adding the program image to the program information to produce composite information; and outputting the composite information.

6. A recording medium recorded with a computer program for causing a computer to perform a method for processing program information, the method comprising:

determining whether a picture type of a current frame of video data multiplexed to a received television broadcast is an intra-frame (I) picture;

if the picture type is determined to be an I picture decoding and converting image data corresponding thereto to produce a program image of the received television broadcast in a JPEG format, and if the picture type is determined not to be the I picture waiting for a next frame of the video data multiplexed to the received television broadcast such that the image data of the current frame is not decoded;

extracting program information from added data multiplexed to the received television broadcast;

adding the program image to the program information to produce composite information; and outputting the composite information.

7. A television broadcast receiving apparatus, comprising:

first receiving means for receiving a first television broadcast;

second receiving means for receiving a second television broadcast;

decoding means for decoding video data multiplexed to the first television broadcast and for outputting the decoded video data as a program video image; and information processing means for decoding, using software, a part of image data included in video data multiplexed to the second television broadcast to produce a program image of the second television broadcast and for outputting the program image, wherein the first and second television broadcasts each undergo inter-frame prediction encoding so as to each form a respective plurality of I, P, and B pictures representative of a plurality of video frames, and wherein the information processing means is operable to determine whether a picture type of a current frame of the video data multiplexed to the second television broadcast is an intra-frame (I) picture, and if the picture type is determined to be an I picture to decode and convert image data corresponding thereto into a JPEG format and to output the decoded and converted image data as the program image, and if the picture type is determined not to be an I picture to wait for a next frame of the video data multiplexed to the second television broadcast such that the image data of the current frame is not decoded.

* * * * *